US011866917B2

(12) United States Patent
Mock et al.

(10) Patent No.: US 11,866,917 B2
(45) Date of Patent: Jan. 9, 2024

(54) APPARATUS FOR DISPENSING A MIXTURE OF A DILUENT AND AN ADDITIVE FOR SANITATION, COSMETIC OR CLEANING APPLICATIONS

(71) Applicant: Gjosa SA, Biel/Bienne (CH)

(72) Inventors: Elmar Mock, Salvan (CH); Markus Müller, Uster (CH); Luc E. Angwerd, Evilard (CH); Li Tao, Zürich (CH)

(73) Assignee: GJOSA SA, Biel/Bienne (CH)

( * ) Notice: Subject to any disclaimer, the term of this patent is extended or adjusted under 35 U.S.C. 154(b) by 972 days.

(21) Appl. No.: 16/626,180

(22) PCT Filed: Jun. 29, 2018

(86) PCT No.: PCT/EP2018/067658
§ 371 (c)(1),
(2) Date: Dec. 23, 2019

(87) PCT Pub. No.: WO2019/002584
PCT Pub. Date: Jan. 3, 2019

(65) Prior Publication Data

US 2020/0181893 A1 Jun. 11, 2020

(30) Foreign Application Priority Data

Jun. 30, 2017 (CH) .................................... 00858/17

(51) Int. Cl.
*E03C 1/00* (2006.01)
*E03C 1/046* (2006.01)
(Continued)

(52) U.S. Cl.
CPC .............. *E03C 1/046* (2013.01); *B01F 25/31* (2022.01); *B01F 25/40* (2022.01);
(Continued)

(58) Field of Classification Search
CPC ............ B01F 35/7176; B01F 35/71745; B01F 35/2213; B01F 35/7132; B01F 35/21112;
(Continued)

(56) References Cited

U.S. PATENT DOCUMENTS 2,120,774 A 6/1938 Belmont
2,891,732 A 6/1959 Orter et al.
(Continued)

FOREIGN PATENT DOCUMENTS

CA 2 437 426 2/2005
CA 2437426 A1 * 2/2005 ............... A61L 2/10
(Continued)

OTHER PUBLICATIONS

European Office Action dated Apr. 26, 2021, Application No. 18 739 786.4, 6 pages.
(Continued)

*Primary Examiner* — Anshu Bhatia
(74) *Attorney, Agent, or Firm* — Rankin, Hill & Clark LLP

(57) ABSTRACT

An apparatus for dispensing a mixture of a diluent and an additive for sanitation, cosmetic or cleaning applications. The apparatus includes a mixing unit for creating a mixture of the diluent and the additive, a diluent supply supplying the diluent to the mixing unit, an additive supply supplying the additive to the mixing unit, an outlet for dispensing the mixture. The diluent supply includes a pump arranged to increase the pressure of the diluent before the diluent enters the mixing unit.

14 Claims, 5 Drawing Sheets

(51) Int. Cl.

| | |
|---|---|
| ***B01F 35/52*** | (2022.01) |
| ***B01F 35/221*** | (2022.01) |
| ***B01F 35/83*** | (2022.01) |
| ***B01F 35/21*** | (2022.01) |
| ***B01F 33/80*** | (2022.01) |
| ***B01F 35/71*** | (2022.01) |
| ***B01F 25/31*** | (2022.01) |
| ***B01F 25/40*** | (2022.01) |

(52) U.S. Cl.
CPC ... *B01F 33/83611* (2022.01); *B01F 35/21112* (2022.01); *B01F 35/2213* (2022.01); *B01F 35/522* (2022.01); *B01F 35/7132* (2022.01); *B01F 35/7176* (2022.01); *B01F 35/71745* (2022.01); *B01F 35/71755* (2022.01); *B01F 35/831* (2022.01)

(58) Field of Classification Search
CPC ........ B01F 35/522; B01F 25/40; B01F 25/31; B01F 35/71755; B01F 33/83611; B01F 35/831
See application file for complete search history.

(56) References Cited

U.S. PATENT DOCUMENTS

| | | | |
|---|---|---|---|
| 3,235,129 | A | 2/1966 | Kruckeberg |
| 3,763,888 | A | 10/1973 | Duecker |
| 3,764,074 | A | 10/1973 | James |
| 3,872,879 | A | 3/1975 | Green |
| 4,262,372 | A | 4/1981 | Ryder |
| 6,187,186 | B1 | 2/2001 | Zhadanov et al. |
| 8,490,891 | B2 | 7/2013 | Chen |
| 9,359,748 | B1 | 6/2016 | Lamy et al. |
| 2005/0103890 | A1 | 5/2005 | Doyle et al. |
| 2009/0045268 | A1 | 2/2009 | Selander et al. |

FOREIGN PATENT DOCUMENTS

| | | |
|---|---|---|
| CN | 105780876 | 7/2016 |
| DE | 29 51 318 | 7/1981 |
| EP | 1 706 643 | 10/2007 |
| EP | 1 773 480 | 6/2008 |
| EP | 2 989 260 | 5/2017 |
| JP | 2000-79357 | 3/2000 |
| NL | 6615994 | 5/1968 |
| WO | 00/11997 | 3/2000 |
| WO | 2005/068836 | 7/2005 |
| WO | 2007/062536 | 6/2007 |
| WO | 2008/037869 | 4/2008 |
| WO | 2009/051501 | 4/2009 |
| WO | 2012/099460 | 7/2012 |

OTHER PUBLICATIONS

International Preliminary Report on Patentability dated Dec. 31, 2019, Application No. PCT/EP2018/067658, 9 pages.

* cited by examiner

APPARATUS FOR DISPENSING A MIXTURE OF A DILUENT AND AN ADDITIVE FOR SANITATION, COSMETIC OR CLEANING APPLICATIONS

BACKGROUND OF THE INVENTION

Field of the Invention

The invention is in the field of washing facilities, in particular in the field of washing devices such as washing devices used in low through-flow rate sanitary facilities and/or body care installations and/or cleaning facilities. The invention relates to an apparatus for dispensing a mixture of a diluent and an additive, typically for sanitation, cosmetics or cleaning applications.

Description of the Related Art

U.S. Pat. No. 8,490,891 discloses an apparatus for adding liquid soap from a container to a water conduit to a shower. The soap in the container is compressed by piston under spring pressure. Delivery of the soap and tensioning the spring controlled by varying the water pressure. This eliminates the need for a soap pump.

U.S. Pat. No. 3,872,879 shows a mixing and dispensing device in which the mains pressure and optionally a pump drives a liquid towards an outlet. When the flow to the outlet is interrupted, or when the mains pressure oscillates, the pressure rises and some liquid is forced back into a container with an additive. The additive is dissolved in the liquid and later, when the pressure sinks, flows to the outlet.

U.S. Pat. No. 9,359,748 shows a shower for dispensing water and a product, e.g., soap. In order to dispense the product, mains water is guided against one side of a piston, pushing the product at the other side of the piston to the shower head. A similar principle is disclosed in WO 2009 051 501.

EP 1706643 and EP 1773480 show devices for adding an additive to a flow of water by means of positive displacement pumps.

WO 0011997 shows a shower head with two selectable flow paths, one flow path leading past a solid or gel soap, thereby allowing a user to select a modus in which soap is added to the water dispensed by the shower. Similar designs with soap cartridges or liquid soap containers are described in WO 2008/037869 and US 2005/103890 and DE 2951318.

EP 2989260 discloses a diffusion device in which a material to be diffused in a stream of liquid is provided in a replaceable capsule.

CA 2 437 426 discloses a wash system with a water source, a pump conveying the water to a mixing unit, and a lotion storage and lotion pump conveying the lotion to the mixing unit. Disinfectant in liquid form can be dispensed through a cylindrical dispenser in which a rod moves to close an inlet to the dispenser and at the same time to open a valve through which the water sucks the disinfectant from the dispenser by means of the venturi effect.

U.S. Pat. No. 2,891,732 discloses a combination shower bath head and soap spray, in which a two way rotary valve can be operate to, on the one hand dispense mains water through a shower nozzle, or, on the other hand to guide the mains water to exert pressure on a soap container and force soap out through a soap dispensing nozzle. The cavities in the valve are never in contact with an additive inlet.

U.S. Pat. No. 3,764,074 discloses a shower head attachment in which a rotary valve can be in a first position in which mains water is dispensed and in a second position in which the mains water sucks both air and soap, the latter from a container, into the flow of water, producing a frothy soap-water mixture.

U.S. Pat. No. 2,120,774 shows a shower bath with valves that can be operated to guide mains water directly to a showerhead or first through chambers containing additives.

In the last three of the above documents there always is a position in which a cavity of the valve is in liquid communication with an additive container and with the outlet. It therefore is not possible to maintain the outlet at a significantly higher pressure than the additive container.

Existing solutions do not allow to precisely control the amount of additive and/or the time at which the additive is supplied. Furthermore, they are not adapted to low flow applications, that is, applications where a diluent, in particular water, is dispensed at a low flow rate.

Often, authorities set demands for a facility being a low through-flow rate facility. For example, a hand washing station is a low through-flow rate hand washing station if the flow rate does not exceed 6 litres per minute. In the case of washing facilities used in kitchen, the washing facility is considered as a low through-flow rate washing facility if the flow rate does not exceed around 7.5 litres per minute. There is an increasing demand for reduction of flow rates in a variety of applications of washing facilities in both body care installations for private or commercial use and private and industrial cleaning facilities.

SUMMARY OF THE INVENTION

It is an object of the invention to create an apparatus for dispensing a mixture of a diluent and an additive of the type mentioned initially, which overcomes the disadvantages mentioned above.

A possible object of the invention is to provide an apparatus for dispensing a mixture of a diluent and an additive in which the pressure of the diluent is increased and the additive is added to the diluent at the increased pressure.

A possible object of the invention is to provide an apparatus for dispensing a mixture of a diluent and an additive with which the additive can be added to the diluent in a pulsed manner with a relatively high pulse frequency.

A possible object of the invention is to provide an apparatus for dispensing a mixture of a diluent and an additive with which the amount of additive added to the diluent can be controlled more precisely.

A possible object of the invention is to provide an apparatus for dispensing a mixture of a diluent and an additive with which the amount of additive and/or the rate at which the additive is added to the diluent is reproducible and in particular wherein the time during which the additive is added is reproducible.

A possible object of the invention is to provide an apparatus for dispensing a mixture of a diluent and an additive which allow a simple operation, especially when pre-dosed additive portions are used.

The apparatus for dispensing a mixture of a diluent and an additive, for sanitation, cosmetic or cleaning applications, includes:

- a mixing unit for creating a mixture of the diluent and the additive,
- a diluent supply supplying the diluent to the mixing unit,
- an additive supply supplying the additive to the mixing unit,
- an outlet for dispensing the mixture, wherein the diluent supply includes a pump arranged to increase the pressure of the diluent before the diluent enters the mixing unit.

Generally, the embodiments described herein are designed to operate at a relatively high operating pressure. The operating pressure is the diluent pressure generated by the pump, or generally speaking, a delivery device. This pressure can be, according to some embodiments, the pressure at which the additive is added to the diluent. The operating pressure can be at least 5 bar or at least 10 bar or at least 15 bar or at least 20 bar or at least 25 bar. The operating pressure can be in the range of 8 bar to 11 bar.

Generally, the embodiments described herein are designed to operate at a relatively low flow of diluent, with a through-flow rate that is less than 6, 4 or two litres per minute.

By means of this relatively high operating pressure, on the one hand, the generation of a rich spray and a satisfying washing or rinsing experience is possible even at the relatively low flow rates. On the other hand, the dispersion of the additive in the diluent and/or foaming of the mixture when discharging it through the outlet can be improved.

In particular, this is done in washing devices for use in sanitary facilities and body care installations, such as showers, hand washing stations, hair washing stations, etc.

In embodiments, the diluent is water. The water can be hot or cold.

The apparatus can include a heating unit for heating the water or generally the diluent. The apparatus can include an additive heating unit for heating only the additive prior to mixing.

In embodiments, the additive is soap, a care product, a detergent or a cleaning agent. In embodiments, the additive is a nutrient agent.

In embodiments, at least one nozzle unit of a low through-flow rate outlet can include at least two nozzles, wherein the nozzles are arranged for generating a spray of water droplets at a reduced flow rate. This can be done by increasing the pressure of the liquid and creating two or more jets of liquid that collide with one another and thereby are atomized, creating the spray of droplets.

Furthermore, the high pressure operation allows for a well-controlled addition of additive to the diluent, both with regard to the amount of additive and the time when it is added.

Furthermore, the high pressure operation can cause or support chemical and physical processes that change chemical and/or physical properties of the additive or the mixture. This can give the additive and mixture improved properties. Such properties can relate to the dissolving of the additive in the diluent, foaming properties, etc.

In particular, the additive can be added in a pulsed manner. This allows for one or more of the following:

- precise dosing of the additive over time, spreading out the admixing of a given quantity of additive over time.
- since the additive is added in a controlled manner, user preferences regarding the amount of additive per time unit and/or the total amount of additive and/or the time during which the additive is dispensed can be defined, and the dispensing realised according to such preferences.
- dispensing either the diluent alone or a mixture at essentially the same flow rate
- an agreeable, special washing experience, massage effects, mechanical effects on an object being treated or cleaned.

The addition of the additive can be triggered by a user, e.g., by a user operating a mechanical or electronic user input element. This can be a manual button, or a foot pedal, or non-contact input element, such as voice or gesture based. Actuation of the input element can trigger the adding of a fixed number of pulses, e.g., just one pulse, or more pulses of additive to the diluent. The one or more pulses of diluent can be generated by adding a pre-dosed quantity of additive from a pre-dosed additive portion, or from a diluent doser, and/or in the same way as explained below for the generation of periodically generated pulses of additive.

In embodiments, the additive is a liquid.

In embodiments, the additive is supplied in the form of portions. Each portion has a portion size. A portion can be pre-packaged.

In embodiments, the pump is arranged to increase the pressure of the diluent at least temporarily to at least 5 bar or at least 10 bar.

In embodiments, the mixing unit includes a static mixer.

In embodiments, parameters such as the amount of additive per time unit and/or the total amount of additive and/or the time during which the additive is dispensed is determined or selected by a user. This can be done by means of one or more user input elements.

In other embodiments, one or more of these parameters is predetermined by the apparatus, e.g., according to a value stored in a control unit of the apparatus, or according to the construction of the apparatus.

A control unit, which can include electrical and mechanical elements, is arranged to control the operation of pumps, valves and any other actuators. It can be configured to read sensor data and user input data. User input data can be read from mechanical or electronic user input elements. User input elements can also act directly on the parameters, typically by mechanical (including hydraulic) elements.

In embodiments, the additive is injected into a main flow of the diluent. The main flow is a flow of diluent, e.g., in a conduit of the apparatus, corresponding to a flow of all or almost all or most (i.e., more than 50% or 60% or 70% or 80% or 90%) of the diluent, on average over time.

In embodiments, the apparatus is configured to inject more than one additive. This can be done by having for each additive a separate injecting arrangement.

In embodiments, volume flows at which the mixture is delivered are between 0.5 and 1.5 or 2.5 litre per minute, in particular between 0.7 and 1 or 1.8 litres per minute. This can be for body care applications.

Depending on the application and configuration, the volume flows can also be from 1.2 to 2.7 litres per minute. In embodiments, the volume flows can be below 5 litres per minute.

In embodiments, the apparatus is configured to operate in a mixing mode, in which a fluid pressure of the diluent in the mixing unit is periodically reduced and the additive is added to the diluent in time periods in which the pressure is reduced.

By periodically reducing the pressure in the mixing unit it becomes possible to add additive to the diluent without having to bring the additive to the full pressure at which the diluent is—for at least part of the time or even the majority of the time—delivered by the pump.

By the reduction in pressure, it also becomes possible to control the flow of the additive into the diluent. That is, a container or reservoir holding the additive can be kept at a pressure that can be lower than the pressure at which the diluent is normally provided, via the mixing unit, to the outlet. Typically, a check valve is arranged in a conduit between the reservoir and the mixing unit. When the pressure in the mixing unit drops below that of the reservoir, the additive flows into the mixing unit.

By periodically reducing the pressure, the flow of the mixture as seen in the direction of the flow appears as an alternating sequence of first sections with just diluent without additive followed by second sections with just additive or a mixture of diluent and additive. In other words, the flow of liquid can be considered as a flow of diluent with periodic sections of pulses of additive.

Typical frequencies at which such pulses of additive are delivered can be relatively high, e.g., from 10 Hz to 0.2 Hz, in particular from 2 Hz to 0.5 Hz.

Typical volumes per pulse of additive can be such that the resulting relative volume of the additive is from 1% or 3% to 8% or 10% of the volume of the diluent. In some embodiments, the relative volume can be lower than 3% or even lower than 1% of the volume of the diluent.

Typical volumes per pulse of additive can be from 0.2 to 5 millilitres, in particular from 0.5 to 3 millilitres, in particular from 1 to 2 millilitres.

Operating the apparatus to dispense or inject additive at such relatively high frequencies and/or with such relatively small volumes allows to precisely control the volume and/or timing with which the additive is delivered These volumes and frequencies can be determined by the apparatus, depending on user input elements, or depending on parameters stored in the apparatus and/or depending on user input data.

In embodiments, the apparatus is configured to reduce the pressure in the mixing unit (periodically) by reducing a flow rate of diluent entering the mixing unit.

Reducing the flow can include completely interrupting the flow.

In embodiments, the apparatus is configured to reduce the flow rate of diluent entering the mixing unit by varying a delivery rate of the pump.

In embodiments, the apparatus is configured to reduce the flow rate of diluent entering the mixing unit by an inlet valve, arranged to control the flow of diluent between the pump and the mixing unit.

In embodiments, the apparatus is configured to reduce the pressure in the mixing unit (periodically) by increasing a flow rate of the mixture exiting the mixing unit.

In embodiments, the apparatus is configured to increase the flow rate of the mixture exiting the mixing unit by an outlet valve, arranged to control the flow of the mixture from the mixing unit to the outlet.

The outlet valve can be part of the mixing unit, or arranged in a conduit between the mixing unit and the outlet unit, or part of the outlet unit, e.g., one or more nozzles of the outlet unit.

In embodiments, the apparatus is configured to increase the flow rate of the mixture exiting the mixing unit by a bypass valve, arranged to control the flow of the mixture from the mixing unit to a bypass outlet.

The bypass outlet can be separate from the outlet.

In embodiments, the apparatus is configured to reduce the pressure in the mixing unit (periodically) by increasing a volume of the mixing unit.

In embodiments, the apparatus is configured to increase the volume of the mixing unit by a volume adjustment element 1 in liquid communication with the mixing unit, wherein in particular the volume adjustment element is an active element whose volume is increasable by applying a force by means of an actuator.

The actuator can drive a movement of an elastic part of the variable volume element, or movement of a plunger. The volume of the mixing unit can be closed off from liquid communication with the supply of diluent and with the outlet by corresponding inlet valves and outlet valves. Thus, in order to decrease the pressure in the mixing unit, these valves are closed and then the volume of the volume adjustment element is increased. The resulting decrease in pressure causes additive from the reservoir of additive to be sucked into the mixing unit. Subsequently, the volume adjustment element 1 returns to its initial state, increasing the pressure in the mixing unit, the valves are opened again and the diluent with the additive flows onward to the outlet.

In embodiments, a flow of the additive into the mixing unit is driven by a pressure difference between the mixing unit and the additive supply.

In embodiments, the pressure difference is created by the additive supply being at atmospheric pressure and reducing the pressure in the mixing unit below atmospheric pressure.

In embodiments, the pressure difference is created by the additive supply including an additive pressurising device arranged to elevate a pressure of the additive supply above atmospheric pressure, and reducing the pressure in the mixing unit below the pressure of the additive supply.

In embodiments, the mixing unit includes an additive chamber or receptacle configured to receive a pre-packaged additive portion (e.g., a capsule), and elements for withholding, or holding back, restraining or blocking the flow of the additive in regions where a mixing flow flows past the additive and erodes the additive while a main flow does not directly affect the additive.

In this way, the main flow does not take part in eroding the additive, and the erosion and dissolution of the additive in the diluent takes place over a longer time. This in turn allows to use an additive that is easier to dissolve than a harder additive that would be required for delaying the erosion of the additive or an additive portion. Thus, such an additive can be quasi liquid or gelatinous, or an additive portion with a gelatinous shell and a liquid interior. If such an additive were not kept away from the main flow, it would be washed away immediately. This is particularly the case for the volumes of additive in additive portions envisioned here:

When additive portions are used, typical volumes per additive portion can be from 0.1 to 2 millilitres, in particular from 0.3 to 1 millilitres. An additive portion can weigh from 2 to 15 grams, in particular from 3 to 10 grams.

When additive portions are used, additive portions, e.g., approximately spherically shaped, can have a diameter of less than 5 or less than 3 or less than 2 millimetres.

Corresponding flow rates of the diluent can be between 0.5 and 1.5 litre per minute, in particular between 0.7 and 1 litres per minute. This can be for body care applications.

Depending on the application and configuration, the volume flows can also be from 1.2 to 2.75 litres per minute. In embodiments, the volume flows can be below 5 litres per minute.

The additive portions can include the additive in liquid or solid form, or in a combination. A combination can be a solid, in particular in gelatinous form, enclosing a liquid.

In embodiments, the apparatus is arranged to guide the flow of the diluent through the additive chamber (for holding an additive portion) at all times.

In this way, a simple construction of the apparatus can be realised. Valves for turning on and off the flow around the additive can be avoided. Instead, turning on and off the admixing of the additive is done by placing an additive portion in the chamber.

In embodiments, the additive chamber comprises, at a downstream end, one or more of:

separating elements for separating the additive portion into smaller additive pieces, and/or of cutting elements, for cutting or perforating a shell of the additive portion.

In this way, the additive can be separated and/or cut into smaller pieces that are then dissolved. This can make the process of dissolution more regular over time and with a reproducible length. In addition, it can extend the time over which the dissolution takes place.

This embodiment can also be realised independently from other features recited so far, that is, as:

An apparatus including a mixing unit including an additive chamber configured to receive a pre-packaged additive portion and elements for withholding the additive wherein the additive chamber comprises, at a downstream end, one or more of separating elements for separating the additive portion into smaller additive pieces, and/or of cutting elements, for cutting or perforating a shell of the additive portion.

In embodiments, the mixing conduit comprises, downstream of the additive chamber, flow restricting elements for restricting a flow of additive through the mixing conduit.

In this way, the additive portion and in particular additive pieces can be held back within the mixing unit while being dissolved by the flow of diluent around them.

In embodiments, the the mixing conduit comprises, downstream of the additive chamber, additive retaining elements, for holding back additive pieces and generating retaining locations at which the flow of diluent is reduced and additive pieces are retained.

In this way, the additive portion and in particular additive pieces can be held back within the mixing unit but in retaining locations at which the flow of diluent is reduced, that is, the main flow does not flow through such retaining locations, rather, only a mixing flow does. The mixing flow typically is small when compared to the main flow, and can be constituted by eddies or whirls in the flow of diluent around the additive retaining elements. Additive pieces can collect at the retaining locations and are then eroded or dissolved by the mixing flow mixing flow.

In embodiments, the mixing unit includes:

a main conduit arranged to carry a main flow of the diluent, and at least one additive chamber arranged to hold an additive portion, the main conduit being arranged to guide the main flow past the additive chamber.

That is, in other words, the main flow does not enter or pass through the additive chamber, only a mixing flow can.

In embodiments, the additive chamber is arranged adjacent to the main conduit, the additive chamber and the main conduit being in fluid communication through one or more passages.

In embodiments, the one or more passages are arranged for the mixing flow to flow into the chamber and out of the chamber at the same location.

In embodiments, the one or more passages are arranged for the mixing flow to flow into the additive chamber by the passage, erode the additive (from the additive portion and) rinse the eroded additive out of the additive chamber by the same one or more passages.

Thus, the mixing flow with the additive joins the main flow at essentially the same location along the main flow as where the mixing flow leaves the main flow. The passage or passages allow for a turbulent flow of a small portion of the diluent into and out of the additive chamber while the main flow of the diluent flows past the passages. For example, less than 0.1% or 5% or 10% of the diluent passes into the additive chamber(s) while the remaining part flows past them.

The additive can be liquid or solid. The mixing flow can be made turbulent by obstructions arranged in the flow path, and/or by moving elements such as propellers or turbines. Such propellers or turbines can be driven by the flow of the diluent. They can be driven by the main flow and be arranged to move a second propeller or turbine that is located in the mixing flow.

According to a further aspect, a mixing unit for creating a mixture of a diluent and an additive is disclosed, the mixing unit including:

a diluent inlet and an additive inlet and a mixture outlet;

a moving element with at least one cavity;

the moving element being arranged to be moved at least from a first position to a second position;

wherein, in the first position, the cavity is in liquid communication with the additive inlet, and in the second position, the cavity is in liquid communication with the diluent inlet and the mixture outlet, and wherein the moving element in combination with a body relative to which it moves forms a liquid-tight barrier between the additive inlet and the diluent inlet, and between the additive inlet and the mixture outlet In an embodiment, in the first position, the cavity is not in liquid communication with the mixture outlet.

The moving element thus seals off the additive inlet from the diluent inlet and the mixture outlet. The moving element thus does not allow for a liquid flow from the diluent inlet, which in the desired use of the additive switch is under a higher pressure, to the additive inlet. Only by moving the moving element can a portion of additive contained in the cavity be brought into the diluent.

Such an additive switch can be used to move additive in liquid form or in solid form into the stream of diluent. In particular, the additive can be in the form of additive portions as described for the second aspect, that is wherein a solid additive portion is placed in a diluent stream and slowly dissolved.

The additive switch replaces a number of valves which otherwise would be required by a simple mechanism. The additive can be supplied at low pressure and the diluent at high pressure.

In embodiments of this mixing unit, in a third position between the first and second position, the cavity is in liquid communication with a drain, and optionally also in liquid communication with a drain vent, the drain vent facilitating a flow of liquid from the cavity into the drain.

In embodiments of this mixing unit, in the first position, the cavity is also in liquid communication with a drain or with an additive vent, for facilitating a flow of additive into the cavity.

In embodiments of this mixing unit, the moving element is arranged to rotate relative to the body.

In embodiments of this mixing unit, the moving element includes more than two cavities, and wherein moving the moving element from the first to the second position brings one cavity after the other in liquid communication with the diluent inlet and mixture outlet.

In embodiments of this mixing unit, the moving element is arranged to rotate around an axis of rotation and the cavities are through holes extending in axial direction through the moving element.

In embodiments of this mixing unit, the moving element is arranged to rotate around an axis of rotation and the cavities are arranged at a circumferential surface of the moving element, extending from there into the moving element.

This mixing unit can be incorporated into the apparatus for dispensing a mixture of a diluent and an additive. The mixing unit can be configured to operate at the pressures and/or the flow rates and/or the frequencies at which pulses of additive are delivered and/or with the volumes per pulse of additive (in relative or absolute terms) and/or in combination with other features of the apparatus as presented above.

BRIEF DESCRIPTION OF THE DRAWINGS

The subject matter of the invention will be explained in more detail in the following text with reference to exemplary embodiments which are illustrated in the attached drawings, in which.

DETAILED DESCRIPTION OF THE INVENTION

In principle, identical parts are provided with the same reference symbols in the figures.

Figure 1:
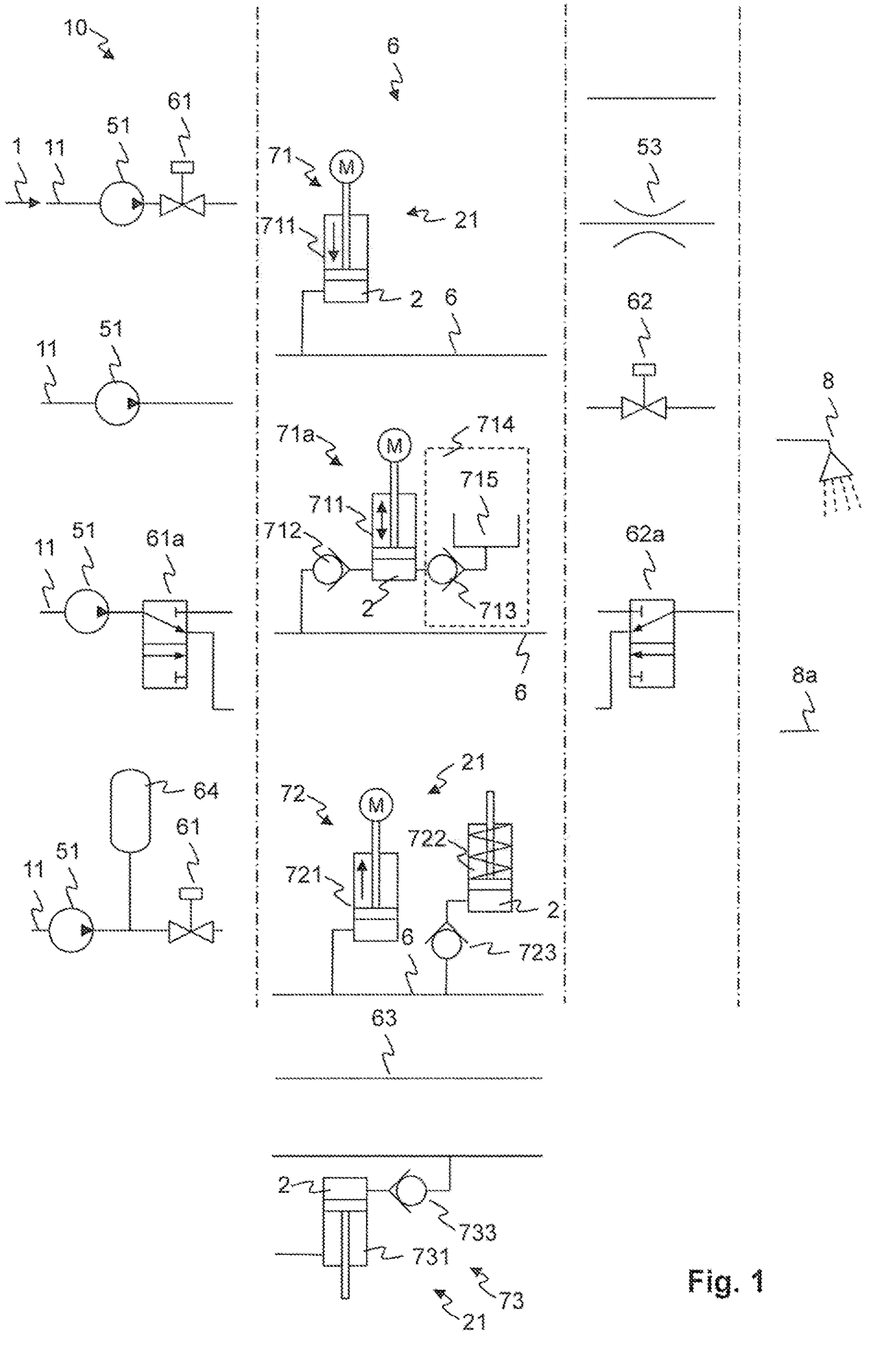
FIGS. 1-1*d* schematically show elements of an apparatus according to a first aspect, for reducing a pressure in a mixing unit in order to periodically add an additive to a diluent 1.

FIG. 1 schematically shows elements of an apparatus according to a first aspect. Therein, a pressure in a mixing unit 10 is reduced in an injecting section 6 in order to periodically add an additive 2 to a diluent 1. The elements, shown from left to right, following one another in the direction of a flow of the diluent 1, are:

- an inlet set of elements such as pumps 51, with or without inlet valves 61, for increasing a pressure of the diluent 1 and controlling a flow of the diluent 1.
- an injection set of elements an injecting section 6, in which additive 2 is added to the diluent 1.
- an outlet set of elements such as outlet valves 62 and/or chokes 53. In some cases, a small flow of diluent 1 can be let to a bypass outlet 8*a*.
- an outlet 8 fed by one of the outlet set of elements. The outlet 8 can itself incorporate the function of a choke 53. This is the case, for example, if the outlet 8 includes nozzles that impede the flow of the mixture.

In principle, the elements of the inlet set, the injection set and the outlet set can be combined with each other—in this order—in arbitrary combinations. In other word, one element van be selected from each set, and the elements can be combined, with a (output) conduit of an element of one set connected to a (input) conduit of an element of a following set. Where the inlet set of elements ends in two (output) conduits, the injecting section 6 should also include two corresponding (input) conduits. Typically, one of these constitutes a bypass section 63.

Possible elements of the inlet set of elements are:

- a pump 51 followed by a controllable valve 61. The valve 61 serves as an inlet valve 61 for the following (injection) section
- a controllable pump 51. It can be controlled to set the pressure in or the flow into the following section. It can in this manner take the place of a pump 51 combined with an inlet valve 61.
- a pump 51 followed by a three-way inlet valve 61*a*. This valve is configured to switch the flow of diluent 1 from one conduit to another. It can be a proportional valve. In particular, it can be configured to switch the flow of diluent 1 from the injecting section 6 to a bypass section 63 and back.
- a pump 51 with an inlet valve 61, and with a pressure spike absorber 64 arranged in liquid communication with a conduit from the pump 51 to the inlet valve 61. The pressure spike absorber 64 can expand its volume in order to absorb pressure shocks or spikes in the conduit between the pump 51 and the inlet valve 61 caused by rapidly closing the inlet valve 61. The pressure spike absorber typically is passive. In particular this can mean that it includes an elastic portion that causes its volume to increase or decrease when its internal pressure increases or decreases, respectively. The elastic portion can be implemented by, for example, a piston with a spring, a membrane, a volume of a gas or air, etc. It can also be implemented by realising the conduit itself with a certain elasticity.

Common to the elements of the inlet set is that they control the flow into the following (injection) section.

Possible elements of the injection set of elements are:

- a first injecting arrangement 71, including an injector 711 for injecting additive 2 into a conduit of the injecting section 6 carrying the diluent 1. The injector 711 includes a drive or actuator arranged to exert a pressure on the additive 2, thereby driving it into the conduit.
- a variation 71*a* of the first injecting arrangement 71, wherein the injector 711 is supplied with additive 2 from an additive replenisher 714. The additive replenisher 714 can provide additive 2 to the injector 711. For example, the additive replenisher 714 includes a backup supply 715 containing additive 2 feeding the injector 711 via a check valve 713. The 715 can be at atmospheric pressure. The injector 711 feeds the injecting section 6 via a further check valve 712. Depending on the direction of movement, the injector 711 draws the additive 2 from the backup supply 715 or supplies the additive 2 to the injecting section 6.
- a second injecting arrangement 72, including a volume adjustment element 721 for temporarily reducing the pressure in the injecting section 6, and a reservoir 722 arranged to inject additive 2 into the injecting section 6, optionally through a check valve 723. An internal volume of the volume adjustment element 721, the reservoir 722 and the injecting section 6 are in liquid communication with each other. The volume adjustment element 721 includes a drive or actuator arranged to increase its internal volume. Thereby, it draws diluent 1 out of the injecting section 6 and reduces the pressure in the injecting section 6. Thereby in turn, additive 2 is drawn out of the reservoir 722 into the injecting section 6. For this to work, the pressure inside the reservoir 722 must be higher than the reduced pressure in the injecting section 6. For increasing the pressure inside the reservoir 722 above atmospheric pressure, in can include a drive or actuator, or an elastic element such as a spring, as shown symbolically in the Figure.

In a variation (not drawn) of the second injecting arrangement 72, the reservoir 722 includes an additive replenisher 714, as described above, for supplying additive 2 to the reservoir 722. In this variation, for drawing the additive 2 from the additive replenisher 714, the reservoir 722 can include an actuator, or it can be configured to be actuated manually. A manual operation is acceptable if the reservoir 722 needs to be replenished at infrequent intervals, as opposed to the relatively high frequency of injection in the injecting section 6.

a third injecting arrangement 73, including a double cylinder 731 with on one side a first chamber and on the other side a second chamber or additive chamber in liquid communication, optionally through a check valve 733, with the injecting section 6. This third injecting arrangement 73 can be used in combination with a three-way inlet valve 61*a*: This is done by joining one of the two outlet conduits to the first chamber or volume at a first side of the double cylinder 731, and joining a second, opposite chamber or volume of the double cylinder 731 to the injecting section 6, optionally via a check valve 733. By operating the three-way inlet valve 61*a* to direct the diluent 1 into the first chamber, a force is exerted on a piston of the double cylinder 731 and thereby the additive 2 in the second chamber. This forces the additive 2 to be injected into the injecting section 6. At the same time, the three-way inlet valve 61*a* can be controlled not to supply any diluent 1 to the injecting section 6, thereby reducing a counterpressure that otherwise might stop the additive 2 from flowing into the injecting section 6.

In a variation (not drawn) of the third injecting arrangement 73, the double cylinder 731 includes an additive replenisher 714, as described above, for supplying additive 2 to the second chamber of the double cylinder 731. Similarly to the second injecting arrangement, for drawing the additive 2 from the additive replenisher 714 into the second chamber, the double cylinder 731 can include an actuator, or it can be configured to be actuated manually. In addition, a venting valve (not drawn) is then required for venting the first volume when additive 2 is drawn into the second volume.

Common to the elements of the injection set is that they inject a small amount of additive 2 into a flow of the diluent 1 while the pressure of the diluent 1 is temporarily reduced.

The check valves mentioned are as a rule arranged to allow for a flow of additive 2 in the direction of the injecting section 6 but not in the opposite direction. Thus, they prevent liquid from flowing from the mixing unit to the additive supply Possible elements of the outlet set of elements are:

a choke 53 or constriction or baffle which impedes the flow of the mixture out of the injecting section 6. The choke 53 can be realised as part of the outlet 8, that is, integrated with the outlet 8.

a controllable valve 62. It can serve as an outlet valve 62 of the injecting section 6.

a three-way outlet valve 62*a*. This valve is configured to switch the flow of liquid from one conduit to another. It can be a proportional valve. In particular, it can be configured to switch either the flow from the injecting section 6 or the flow from the bypass section 63 to flow into the outlet 8.

Common to the elements of the outlet set is that they control the flow out of the preceding (injection) section. This can be done actively, as with a controlled valve, or passively, with a choke 53, in which the flow is a function of the pressure difference across the choke 53.

Generally, the controllable elements such as valves, volume adjustment elements 721 etc. can be controlled e.g., by electrical, hydraulic, pneumatic means.

FIGS. 1*a*-1*d* schematically show selected combinations of the elements described above. They have in common that the pressure in the injecting section 6 is periodically lowered from a relatively high operating pressure to a lower pressure at which the additive 2 is injected. Also, the additive 2 is injected into a main flow, that is, a conduit through which all or almost all or most (i.e., more than 50% or 60% or 70% or 80% or 90%) of the diluent 1 flows, on average over time. In this respect, note that in FIG. 1*c*, the bypass section 63 carries the diluent 1 only during time intervals in which additive 2 is added in the injecting section 6. Thus, here too, the main flow is through the injecting section 6.

Figure 1A:
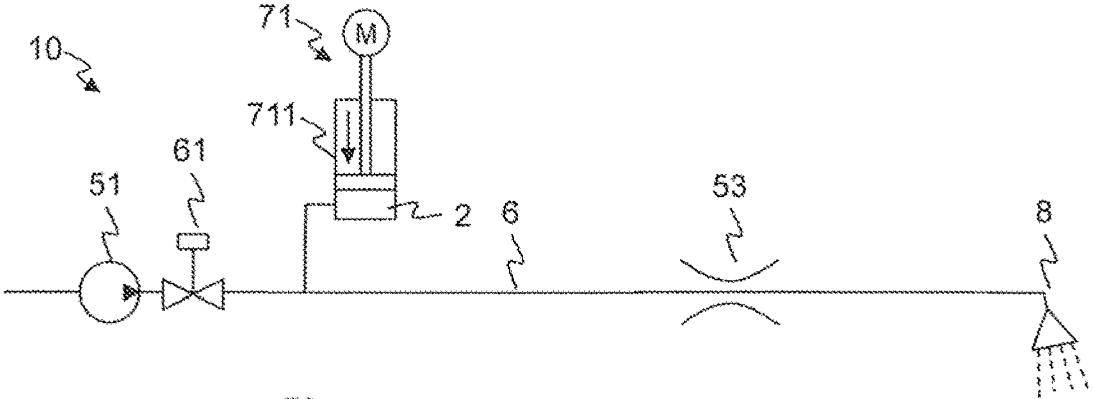

FIG. 1*a* shows an embodiment in which the outflow of the injecting section 6 is constrained not by an active outlet valve 62, but by a choke 53. When the pump 51 is in operation, the pressure in the injecting section 6 corresponds to an equilibrium stated that is determined by a characteristic curve of the pump 51 (relating its flow rate to the pressure difference across the pump, or to the pressure in the injecting section 6) and a characteristic curve of the choke 53 (relating its flow rate to the pressure difference across the choke 53). Briefly reducing the power supplied to the pump 51 or shutting off the inlet valve 61, while the outflow through the choke 53 continues, shifts this equilibrium to the lower pressure used for injection of additive 2.

Figure 1B:
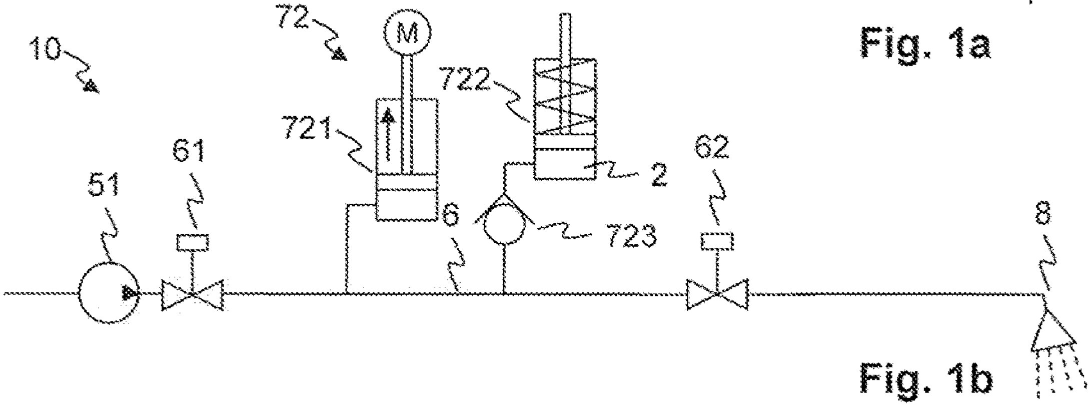

FIG. 1*b* shows an embodiment in which the injecting section 6 is configured to be periodically shut off entirely from the inlet and outlet during injection time intervals. During these injection time intervals, the second injecting arrangement 72 is activated.

Figure 1C:
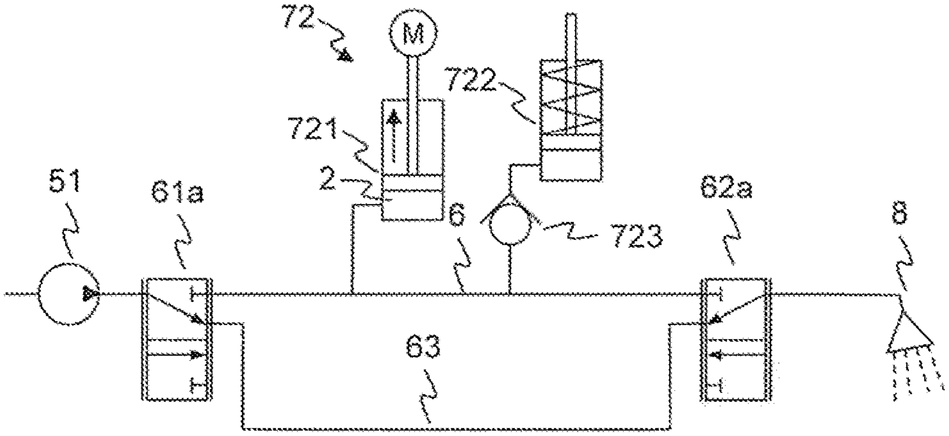

FIG. 1*c* shows an embodiment in which, during injection time intervals, the flow of diluent 1 is diverted from the injecting section 6 through a bypass section 63. This reduces pressure spikes on the inlet side, and generates a more steady, quasi uninterrupted flow at the outlet side.

Figure 1D:
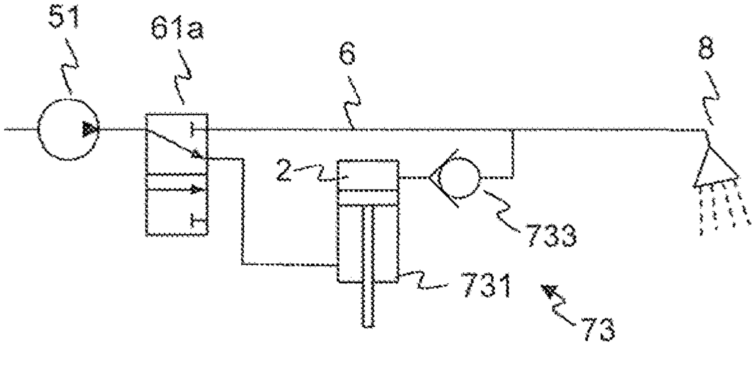

FIG. 1*d* shows an embodiment in which, during injection time intervals, a portion of the flow of diluent 1 is diverted to drive the double cylinder 731 to inject additive 2 into the outlet 8. Here, as in FIG. 1*c*, the outlet 8 is understood to include an integrated choke 53, e.g., by having nozzles that on the one hand spray the mixture and on the other hand restrict the outflow of the mixture.

As explained with regard to FIG. 1, in each of FIGS. 1*a*-1*c* the injecting arrangements are generally interchangeable, except for the third injecting arrangement 73.

Figure 2A:
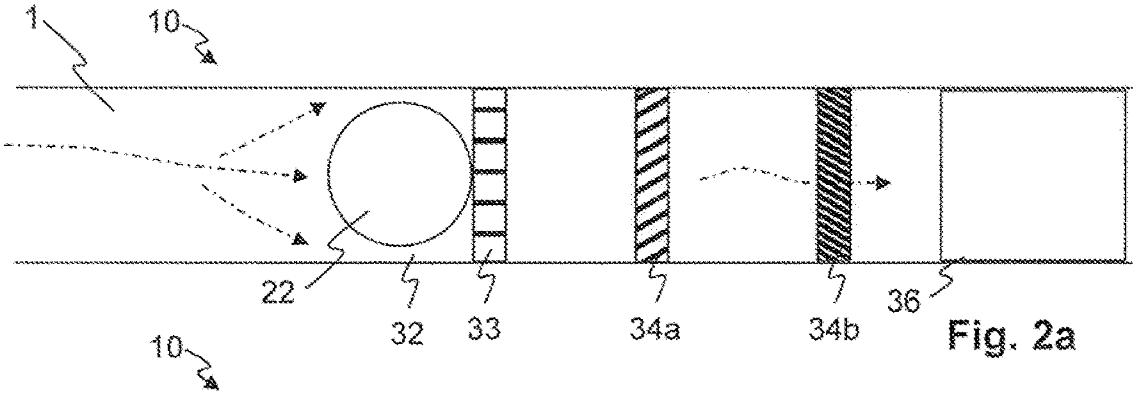
FIGS. 2*a*-3 schematically show an apparatus and additive retaining elements according to a second aspect, for slowly dissolving an additive portion placed in a diluent stream.
Figure 2B:
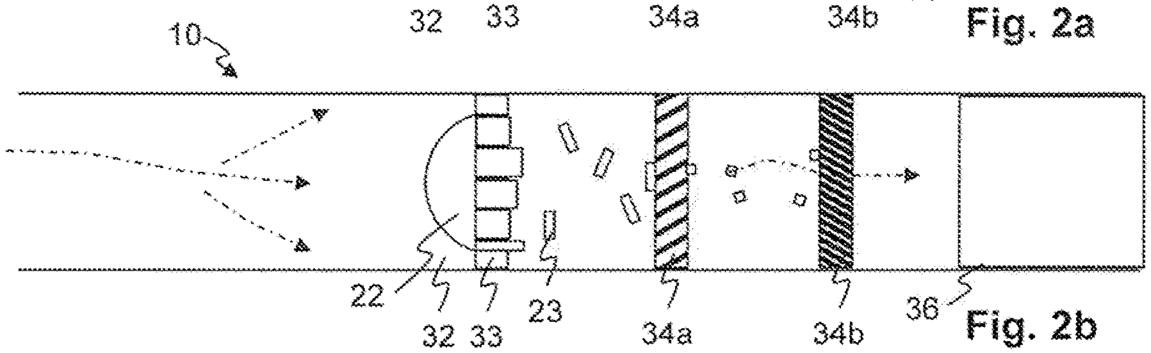
Figure 2C:
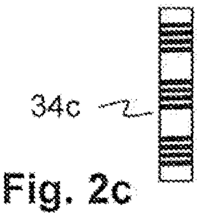
Figure 2D:
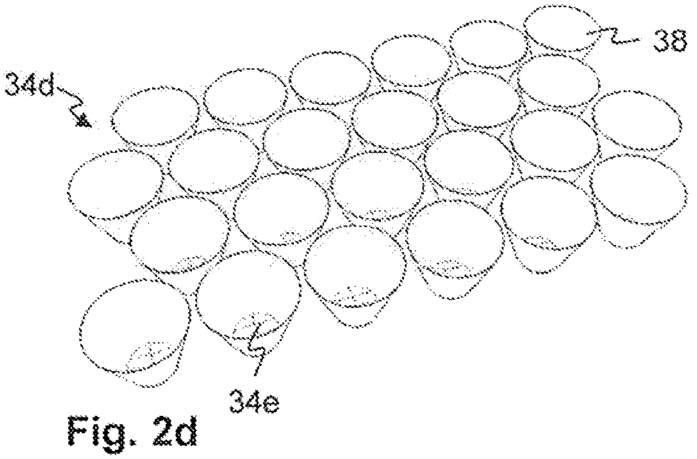
Figure 2E:
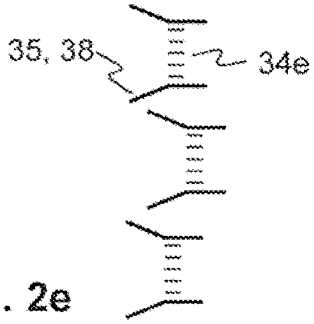
Figure 3:
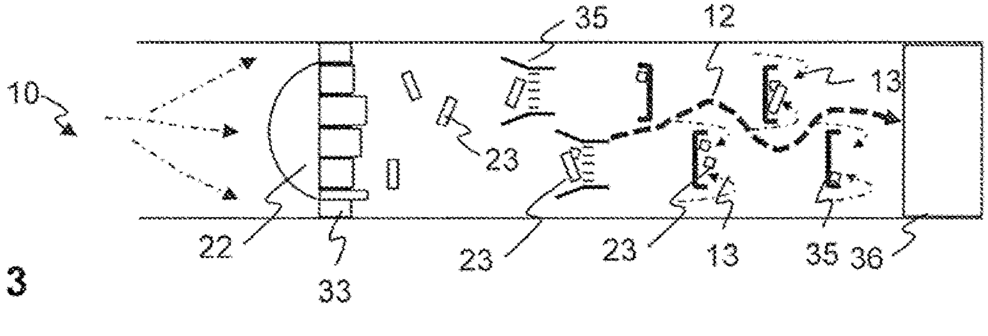

FIGS. 2-3 schematically show an apparatus according to a second aspect. Therein, for slowly dissolving an additive portion 22 placed in a diluent stream, the additive portion 22 is placed in a chamber 32. Downstream of the chamber 32, a cutter 33 is arranged. The additive portion 22 is of a material that can be cut or perforated by the cutter 33 when pressed against the cutter 33 by the flow of diluent 1. Furthermore, the material can be dissolved in the diluent 1. For example, the additive portion 22 is a gelatinous material throughout, or includes a liquid portion encapsulated in a gelatinous material. FIG. 2*a* shows an initial state, with the additive portion 22 being pressed against the cutter 33. FIGS. 2*b* and 3 show a state in which part of the additive portion 22 has been pushed through the cutter 33 and separated into additive pieces 23. The additive pieces 23 are carried along by the flow of diluent 1. These pieces can be solid or liquid. Further elements are arranged to retain these additive pieces 23 and allow the diluent 1 to dissolve them.

For this purpose, following the cutter, seen in the direction of the flow of diluent 1, one or more meshes 34 are arranged (FIG. 2*b*), and/or a static mixer 36 and/or additive retaining elements 35 (FIG. 3). According to different embodiments, there can be present:

- one or more meshes 34, with or without a static mixer 36, or
- additive retaining elements 35, with or without a static mixer 36, or
- a combination of meshes 34 with additive retaining elements 35, with or without a static mixer 36, or
- just a static mixer 36, or
- just the cutter 33 without any other such element.

In the embodiment of FIGS. 2*a* and 2*b* is shown a sequence of meshes 34, with a coarse mesh 34*a* followed by a finer mesh 34*b*. According to FIG. 2*c*, an irregular or two-level mesh 34*c* can include section with a finer and sections with a coarser mesh. According to FIG. 2*d* (perspective view) and FIG. 2*e* (cross section), a combined cutter and mesh 34*d* can combine one or more of pipe sections or funnels 38, arranged in a grid pattern that allows diluent 1 to flow both through gaps in between the pipe sections or funnels 38, and through the pipe sections or funnels 38. The pipe sections or funnels 38 can include at an upstream end—as seen in the direction of the flow—cutting edges arranged to hold back and cut up the additive portion 22 or parts of it into smaller additive pieces 23. Further downstream or at a downstream end, the pipe sections or funnels 38 can include each a further mesh 34*e* which is finer than that of a mesh corresponding to a spacing of the pipe sections or funnels 38. The pipe sections or funnels 38, optionally together with their meshes 34*e*, serve as additive retaining elements. Their function is analogous to that of the additive retaining elements 35 of FIG. 3. Two or more of the arrangements of FIG. 2*d/e* can be arranged to follow one another in the stream of diluent 1.

The meshes 34 and additive retaining elements 35, 38 serve to hold back the additive pieces 23 while the flow of diluent 1 erodes and/or dissolves them, carrying away the additive 2 and thereby creating the mixture. The meshes 34 and additive retaining elements 35, 38 shown in FIGS. 2-3 can all be of the same type, or the different types can be combined. They can be arranged to span the entire passage of the mixing unit 10, and/or some of them or all of them can be staggered, leaving room for the diluent 1 to flow past them. The static mixer 36 can further aid the mixing and dissolution process.

In order to delay the erosion and/or dissolution of the additive piece 23, the additive retaining elements 35 create regions in which the flow of diluent 1 is reduced. This can be done, e.g. in the form of eddies or vertices, as shown for the three rightmost additive retaining elements 35 of FIG. 3, and similarly for the embodiment of FIG. 4. Or this can be done by reducing an area through which diluent 1 can flow through them, as shown for the two leftmost additive retaining elements 35 of FIG. 3. The latter can be closed (third additive retaining element 35 from the left) or can themselves include openings, as shown in the first two additive retaining elements 35 from the left, which in this case are funnels 38 as already described. In each case, they create a mixing flow 13 which is separate from a main flow 12 of the diluent 1. Essentially, only the mixing flow 13 affects the additive pieces 23, while the main flow 12 does not. In consequence, the erosion or dissolution of the additive pieces 23 is less pronounced that it would be if the entire flow would pass by and affect the additive pieces 23.

Figure 4:
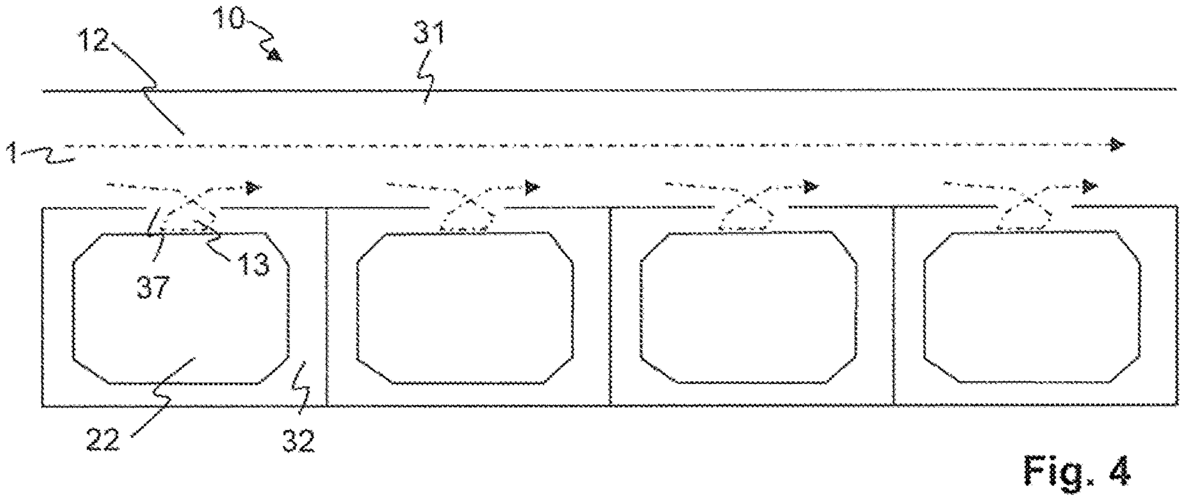
FIG. 4 schematically shows an apparatus according to a third aspect, for slowly dissolving an additive portion placed adjacent to a diluent stream and eroded by a mixing flow.

FIG. 4 schematically shows an apparatus according to a third aspect, for slowly dissolving an additive portion 22 placed adjacent to a diluent stream and eroded by a mixing flow 13. One or more additive portions 22 are placed, each in a corresponding chamber 32. The chambers 32 are adjacent to a main conduit 31 carrying a main flow 12 of the diluent 1. Passages 37 allow diluent 1 to flow from the main conduit 31 into an out of the chambers 32. A resulting mixing flow 13 is small with respect to the main flow 12. Consequently, the erosion and/or dilution of the additive 2 is smaller than if the entire flow were to erode or dissolve it.

FIGS. 5*a*-5*f* schematically show an apparatus according to a fourth aspect, in which a portion of additive is brought into a flow of diluent by a mechanical element. The apparatus serves as a mixing unit. It includes an additive switch 9 with a body 98 relative to which a moving element 99 is arranged to be displaced, e.g. in a linear or rotating movement. The moving element 99 includes one or more cavities 97, which by the movement are sequentially brought into liquid communication with conduits for the additive 2 and the diluent 1, thereby moving the additive 2 into the stream of diluent 1.

Figure 5A:
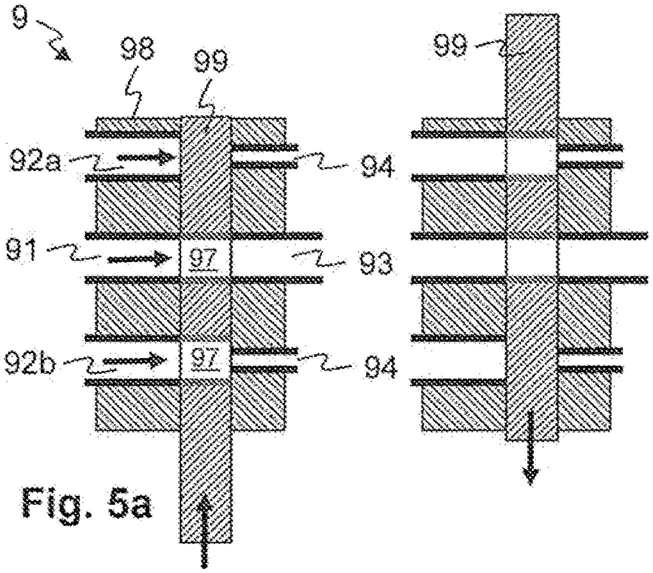
FIGS. 5*a*-*f* schematically show an apparatus according to a fourth aspect, in which a portion of additive is brought into a flow of diluent by a mechanical element.

FIG. 5*a* shows an embodiment with linear movement of the moving element 99 enclosed in a body 98 with a diluent inlet 91 and additive inlets 92*a*, 92*b* and a mixture outlet 93. By moving the moving element 99 from a first position (left in Figure) to an second position (to the right), a lower cavity 97 which first was in liquid communication with a lower additive inlet 92*b* is brought into the path of flow between the diluent inlet 91 and the mixture outlet 93. This inserts a portion of additive 2 into the flow of diluent 1. By the same movement, an upper cavity 97, which formerly was in the path between the diluent inlet 91 and mixture outlet 93, is brought into liquid communication with an upper additive inlet 92*a*. This upper cavity 97 is initially filled with diluent 1, which is replaced by additive 2 from the upper additive inlet 92*a* and flows out through a drain 94. The movement of the moving element 99 can now be reversed, with the upper cavity 97 supplying the next portion of additive 2. Thus, for each cycle of movement, two portions of additive 2 are added to the diluent 1.

This embodiment can also be realised with just a single additive inlet 92 and corresponding drain 94. Then, only one portion of additive 2 is supplied for each cycle of movement.

Figure 5F:
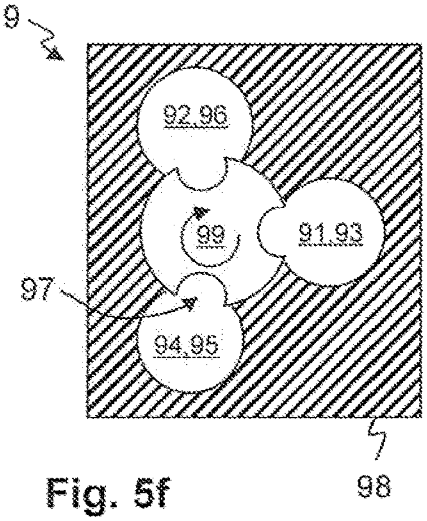
Figure 5B:
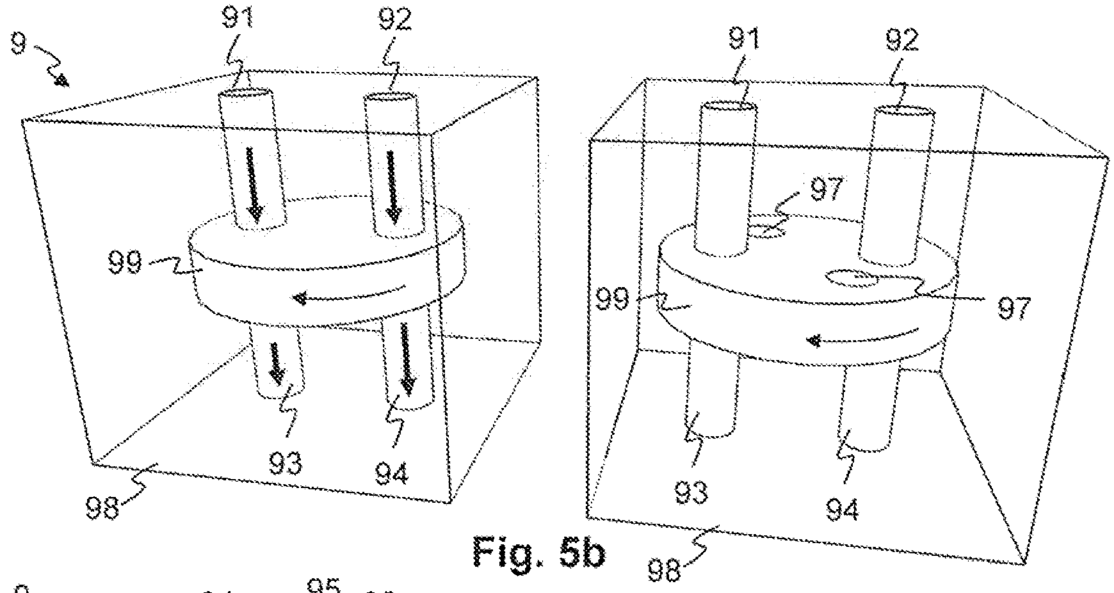

The linear movement can be replaced by a rotating movement of the moving element 99 in the body 98, shown in FIG. 5*b*. The function of the diluent inlet 91, additive inlet 92, mixture outlet 93, drain 94 and moving element 99 with cavities 97 is the same as regards the flow of liquids. The direction of flow in the conduits is indicated by arrows. The moving element 99 is a disc with parallel axial end surfaces, with one or more cavities 97 being through holes extending in an axial direction of the moving element 99 from one end surface to the other. The body 98 is drawn as being transparent and only in outline. In order to provide a liquid-tight operation, the body 98 on its inside has flat surfaces pressed against the two end surfaces of the moving element 99. Elements for effecting the rotation of the moving element 99, such as a drive and shaft, are omitted for clarity.

Instead of the reciprocating movement of the linear arrangement, either a back and forth rotation between two end positions, or a rotation in always the same direction can be implemented. FIG. 5*b* shows (to the left), the moving element 99 in a first position, with a first cavity (not visible) in line with the diluent inlet 91 and mixture outlet 93 and a second cavity in line with the additive inlet 92 and drain 94. To the right, the moving element 99 has been rotated in the direction of the arrow and the formerly hidden cavities 97 are visible. This rotation brings one cavity 97 filled with diluent 1 to the additive inlet 92 and drain 94, where the diluent 1 flows into the drain 94 and is replaced by additive 2. By the same rotation, the other cavity 97 filled with additive 2 is moved into the path from the diluent inlet 91 to the mixture outlet 93, where the additive 2 flows out through the mixture outlet 93.

The inflow of additive 2 through the additive inlet 92 is adjusted to be enough to replace the diluent 1 that is present in the cavity 97, but not too much, which would lead to additive 2 flowing out of the drain 94. In another embodiment, the additive 2 is supplied from below and pushes out the diluent 1 through the drain 94 placed above the moving element 99.

Figure 5C:
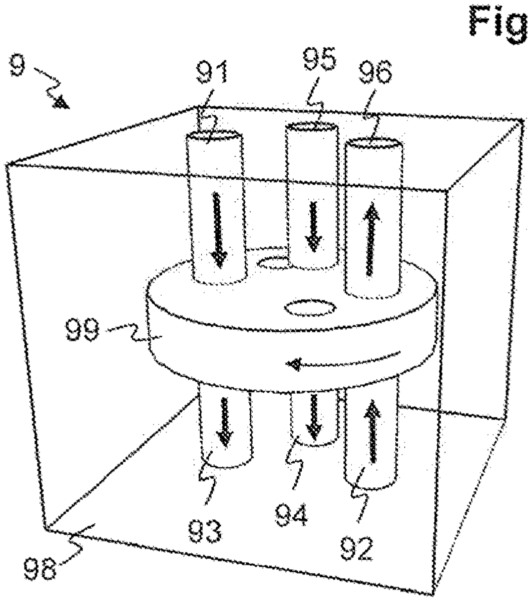

FIG. 5*c* shows an embodiment that prevents the outflow of additive 2 through the drain 94. Therein, the cavities 97 after moving out of the stream of diluent 1 first move into a path between a drain 94 and a drain vent 95. The drain vent 95 supplies air actively or passively, allowing the diluent 1 to pass into the drain 94, driven by the air and/or gravity, and filling the cavity 97 with air. Preferably, the direction of movement of diluent 1 and air is downward. After further movement of the moving element 99, the cavity 97 now filled with air moves into a path between the additive inlet 92 and an additive vent 96. Here, the additive 2, driven actively, e.g., by a pump and/or passively, e.g., by gravity, being in liquid communication with a reservoir placed higher than the cavity 97, replaces the air and fills the cavity 97. Preferably, the direction of movement of additive 2 and air is upward.

In the embodiments of the additive switch 9 described so far, the flow of diluent 1 is blocked most of the time while the moving element 99 moves from the first to the second position and to the first again. In intermediate positions, the flow from diluent inlet 91 to mixture outlet 93 is temporarily cut off. As a result, the movement of the moving element 99 should be quite fast, unless the additive switch 9 is part of a system with a bypass section 63 for leading diluent 1 to the outlet 8.

Figure 5D:
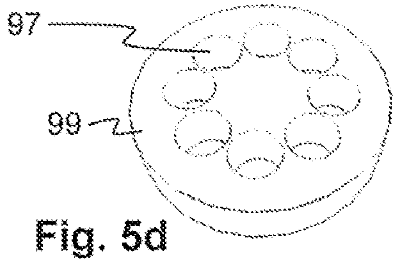
Figure 5E:
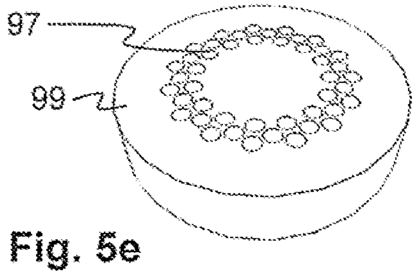

FIGS. 5*d* and 5*e* show moving elements moving element 99 that allow for a quasi-uninterrupted flow of diluent 1. Instead of just one or two cavities 97, there is a plurality, so that always at least one cavity 97 forms a direct conduit from the diluent inlet 91 to the mixture outlet 93. The operation of the additive switch 9 as a whole is as already described, for embodiments with or without drain vent 95 and additive vent 96. The difference is that the additive 2 that is transported from the additive inlet 92 to the mixture outlet 93 is spread out over the plurality of cavities 97. The rotation of the moving element 99 can be stopped at any position without significantly changing the flow rate of diluent 1 to the mixture outlet 93. The amount of additive 2 added to the mixture is determined by the speed at which the moving element 99 is rotated.

In the embodiments shown so far, the cavities 97 extend in the axial direction, parallel to the axis of rotation of the moving element 99. In other embodiments, the cavity 97 extend in, e.g., the radial direction. An example is shown in FIG. 5*f*: the additive switch 9, as seen in the direction of its axis of rotation, is a cylinder or sphere, or other body with rotational symmetry, with at least one cavity 97 at its circumferential surface. Rotating the moving element 99 brings the at least one cavity 97 into liquid connection with:

a first conduit from the diluent inlet 91 to the mixture outlet 93 (the figure shows it in a sectional view, normal to the direction of flow); then a second conduit serving as drain 94 and drain vent 95; and then a third conduit serving as additive inlet 92 and additive vent 96;

and then the first conduit again.

The second conduit is preferably arranged below the moving element 99, so that diluent 1 flows out of the cavity 97 and is replaced by air in the second conduit. For this, the second conduit can be open at the bottom, to allow diluent 1 to rapidly flow out.

The third conduit is preferably arranged above the moving element 99, so that additive 2 flows into the cavity 97 and air flows upwards out of the cavity 97. For this, the second conduit can be open at the top, to allow air to rapidly rise through the additive 2.

Although FIG. 5*f* shows the moving element 99 having three cavities 97, it might also have just one or two. Alternatively, it can have more than three, as long as no cavity 97 can be moved to be, at the same time, in liquid communication with the diluent inlet 91/mixture outlet 93 and one of the other conduits.

In further embodiments (not shown), cavities 97 have openings leading from an axial surface to a radial surface.

Figure 6A:
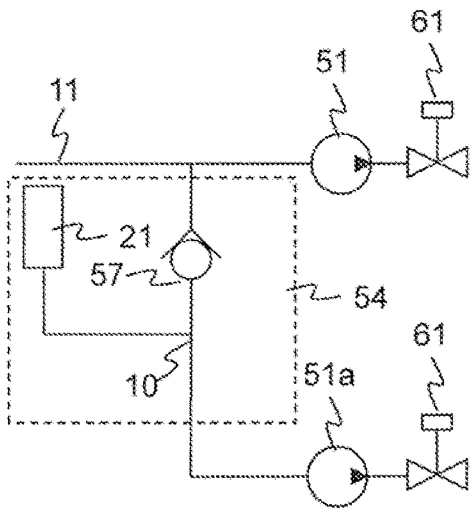
FIGS. 6*a*-6*b* schematically show an apparatus according to a fifth aspect, in which a diluent and a mixture of diluent and additive are supplied through separate pumps.
Figure 6B:
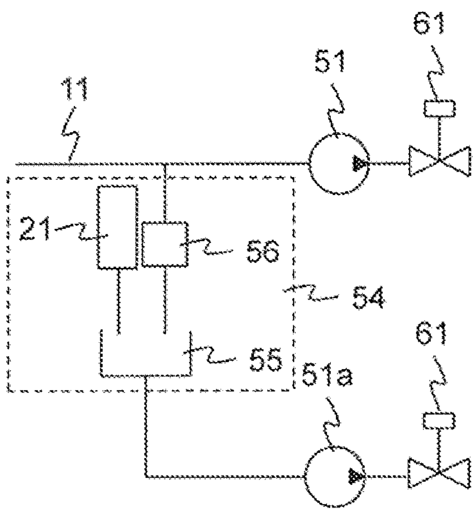

FIGS. 6*a*-6*b* schematically show an apparatus according to a fifth aspect, in which a diluent and a mixture of diluent and additive are supplied through separate pumps 51,51*a*. The mixing of the diluent 1 and additive 2 is accomplished before pressurising by means of these pumps. For this, a low pressure mixer 54 is arranged to mix the diluent 1 and additive 2 and to supply the resulting mixture to a second pump 51*a*. The second pump 51*a* brings the mixture to the operating pressure, and the (first) pump brings the diluent 1 to the operating pressure. Each of the pumps can be followed by a corresponding inlet valve 61 for modulating the flow of the pressurised diluent 1 or mixture, respectively. The modulated flows:

can be combined in a junction and discharged through the same outlet 8, or can be discharged through separate nozzles or nozzle sets of the same outlet 8, or can be discharged through separate outlets 8.

The low pressure mixer 54 can include, as shown in FIG. 6*a*, a check valve 57 through which diluent 1 is drawn from the diluent supply 11 to the second pump 51*a*. The check valve 57 prevents contamination of the diluent supply 11 by the additive 2. An additive supply 21 provides additive 2 to the conduit leading to the second pump 51*a*, with the conduit thereby serving as mixing unit 10. The additive supply 21 can include elements as shown for the injecting section 6 in FIG. 1, such as a reservoir 722 with or without a backup supply 715 and corresponding valves and actuators.

The low pressure mixer 54 can include, as shown in FIG. 6*b*, a mixing container 55 at essentially atmospheric pressure. The mixing container eliminates the need for the check valve 57. It also serves as a mixing unit. The mixture is drawn from this container by the second pump 51*a*. The mixing container 55 is fed by an additive supply 21 as explained above, and a diluent doser 56. The diluent doser 56 supplies diluent to the mixing container 55 and can include a controllable valve and/or a pressure reduction baffle and/or a control apparatus for maintaining a predetermined level of liquid in the mixing container 55.

An apparatus according to the fifth aspect serves for dispensing a mixture of a diluent and an additive for sanitation, cosmetic or cleaning applications, the apparatus 1 including:

a mixing unit 10 for creating a mixture of the diluent 1 and the additive 2, a diluent supply 11 supplying the diluent 1 to a first pump 51 and to the mixing unit 10, an additive supply 21 supplying the additive 2 to the mixing unit 10, the first pump 51 being arranged to increase the pressure of the diluent 1, a second pump 51 arranged to increase the pressure of the mixture, at least one outlet 8 for dispensing the diluent 1 provided by the pump 51 and the mixture provided by the second pump 51*a*.

The first and second pump 51, 51*a* can be controlled to discharge the mixture intermittently, in a pulsed manner. Frequencies and/or volumes for the pulsed discharge are as described elsewhere in the present application. As for the other aspects described herein, operating the apparatus to dispense or inject additive 2 at such relatively high frequencies and/or with such relatively small volumes allows to precisely control the volume and/or timing with which the additive 2 is delivered.

According to an embodiment of this fifth aspect, the apparatus is a standalone or autonomous unit, physically independent from a mains supply but with a diluent container instead, from which the diluent supply 11 is fed.

The apparatus according to the second aspect, as shown in an exemplary manner in FIGS. 2*a*-3, can be implemented in combination with elements of FIG. 1. In particular, the apparatus can take the place of the injecting section 6. For this, the apparatus can include the additive switch 9 and an additive supply 21.

The apparatus according to the third aspect, as shown in an exemplary manner in FIG. 4, can be implemented in combination with elements of FIG. 1. In particular, the apparatus can take the place of the injecting section 6.

The apparatus according to the fourth aspect, as shown in an exemplary manner in FIGS. 5*a-f*, can be implemented in combination with elements of FIG. 1. In particular, the apparatus can take the place of the injecting section 6.

While the invention has been described in present embodiments, it is distinctly understood that the invention is not limited thereto, but may be otherwise variously embodied and practised within the scope of the claims.

The invention claimed is:

1. An apparatus, for dispensing a mixture of a diluent and an additive for sanitation, cosmetic, or cleaning applications, the apparatus comprising:

a mixing unit for creating a mixture of the diluent and the additive, a diluent supply supplying the diluent to the mixing unit, an additive supply supplying the additive to the mixing unit, and an outlet for dispensing the mixture, wherein the mixing unit comprises an additive chamber configured to receive a pre-packaged additive portion and elements for withholding the additive in regions where a mixing flow flows past the additive and erodes the additive while a main flow does not directly affect the additive.

2. The apparatus of claim 1, arranged to guide the flow of the diluent through the additive chamber at all times.

3. The apparatus of claim 1, wherein the additive chamber comprises, at a downstream end, one or more of separating elements for separating the additive portion into smaller additive pieces, and/or of cutting elements, for cutting or perforating a shell of the additive portion.

4. The apparatus of claim 1, wherein the mixing conduit comprises, downstream of the additive chamber, flow restricting elements for restricting a flow of additive through the mixing conduit.

5. The apparatus of claim 1, wherein the mixing conduit comprises, downstream of the additive chamber, additive retaining elements for holding back additive pieces and generating retaining locations at which the flow of diluent is reduced and additive pieces are retained.

6. An apparatus for dispensing a mixture of a diluent and an additive for sanitation, cosmetic, or cleaning applications, the apparatus comprising:

a mixing unit for creating a mixture of the diluent and the additive, a diluent supply supplying the diluent to the mixing unit, an additive supply supplying the additive to the mixing unit, and an outlet for dispensing the mixture, wherein the mixing unit comprises a main conduit arranged to carry a main flow of the diluent, and at least one additive chamber arranged to hold an additive portion, the main conduit being arranged to guide the main flow past the additive chamber;

wherein the additive chamber is arranged adjacent to the main conduit, the additive chamber and the main conduit being in fluid communication through one or more passages; and wherein the one or more passages are arranged for the mixing flow to flow into the chamber and out of the chamber at the same location.

7. The apparatus of claim 6, wherein the one or more passages are arranged for the mixing flow to flow into the additive chamber by the passage, erode the additive rinse the eroded additive out of the additive chamber by the same one or more passages.

8. A mixing unit for creating a mixture of a diluent and an additive, as part of the apparatus for dispensing a mixture of a diluent and an additive for sanitation, cosmetic, or cleaning applications, the apparatus comprising:

a mixing unit for creating a mixture of the diluent and the additive, a diluent supply supplying the diluent to the mixing unit, an additive supply supplying the additive to the mixing unit, and an outlet for dispensing the mixture, wherein the apparatus adds the additive to the diluent in a pulsed manner, the mixing unit comprising:

a diluent inlet and an additive inlet and a mixture outlet;

a moving element with at least one cavity;

the moving element being arranged to be moved at least from a first position to a second position;

wherein, in the first position, the at least one cavity is in liquid communication with the additive inlet and not in liquid communication with the mixture outlet, and in the second position, the cavity is in liquid communication with the diluent inlet and the mixture outlet, and wherein the moving element in combination with a body relative to which it moves forms a liquid-tight barrier between the additive inlet and the diluent inlet, and between the additive inlet and the mixture outlet.

9. The mixing unit of claim 8, wherein, in a third position between the first and second position, the cavity is in liquid communication with a drain, and optionally also in liquid communication with a drain vent, the drain vent facilitating a flow of liquid from the cavity into the drain.

10. The mixing unit of claim 8, wherein in the first position, the cavity is also in liquid communication with a drain or with an additive vent, for facilitating a flow of additive into the cavity.

11. The mixing unit of claim 8, wherein the moving element is arranged to rotate relative to the body.

12. The mixing unit of claim 8, wherein the moving element comprises more than two cavities, and wherein moving the moving element from the first to the second position brings one cavity after the other in liquid communication with the diluent inlet and mixture outlet.

13. The mixing unit of claim 11, wherein the moving element is arranged to rotate around an axis of rotation and the cavities are through holes extending in axial direction through the moving element.

14. The mixing unit of claim 11, wherein the moving element is arranged to rotate around an axis of rotation and the cavities are arranged at a circumferential surface of the moving element, extending from there into the moving element.

* * * * *